US012607199B2

(12) United States Patent
Kanzaka

(10) Patent No.: US 12,607,199 B2
(45) Date of Patent: Apr. 21, 2026

(54) COMPRESSOR COVER, CENTRIFUGAL COMPRESSOR, TURBOCHARGER, METHOD FOR MANUFACTURING COMPRESSOR COVER, AND DIFFUSER FOR CENTRIFUGAL COMPRESSOR

(71) Applicant: MITSUBISHI HEAVY INDUSTRIES ENGINE & TURBOCHARGER, LTD., Sagamihara (JP)

(72) Inventor: Tadashi Kanzaka, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/850,275

(22) PCT Filed: Mar. 31, 2022

(86) PCT No.: PCT/JP2022/016462
§ 371 (c)(1),
(2) Date: Sep. 24, 2024

(87) PCT Pub. No.: WO2023/188246
PCT Pub. Date: Oct. 5, 2023

(65) Prior Publication Data
US 2025/0215892 A1 Jul. 3, 2025

(51) Int. Cl.
*F04D 29/44* (2006.01)
*F04D 17/10* (2006.01)
(Continued)

(52) U.S. Cl.
CPC ........... *F04D 29/441* (2013.01); *F04D 17/10* (2013.01); *F01D 9/026* (2013.01); *F02B 33/40* (2013.01);
(Continued)

(58) Field of Classification Search
CPC .. F01D 9/026; F05D 2250/52; F05D 2220/40; F04D 17/10; F04D 29/441; F04D 29/4206; F02B 33/40
See application file for complete search history.

(56) References Cited

U.S. PATENT DOCUMENTS

2010/0178163 A1 7/2010 Dettmann et al.
2013/0266432 A1* 10/2013 Iwakiri ............... F04D 29/4206 415/204
(Continued)

FOREIGN PATENT DOCUMENTS

JP 2010-529358 A 8/2010
JP 2016-108994 A 6/2016
(Continued)

OTHER PUBLICATIONS

International Preliminary Report on Patentability and Written Opinion of the International Searching Authority for International Application No. PCT/JP2022/016462, dated Sep. 24, 2024, with an English translation.
(Continued)

*Primary Examiner* — Nathaniel E Wiehe
*Assistant Examiner* — Art Golik
(74) *Attorney, Agent, or Firm* — Birch, Stewart, Kolasch & Birch, LLP

(57) ABSTRACT

Provided is an annular compressor cover forming a passage wall of a diffuser passage in a centrifugal compressor, wherein, when the end-of-winding position of a scroll passage of the centrifugal compressor is defined as the 360° position of the compressor cover in the circumferential direction, the direction in which a fluid flows through the scroll passage in the circumferential direction is defined as the positive direction of positions in the circumferential direction, and the distance between outlets of the diffuser passage at each position in the circumferential direction and
(Continued)

the central axis of the inner circumferential surface of the compressor cover is defined as the diffuser radius, the average value of the diffuser radius in a range up to 180° from the position of a tongue section of the scroll passage in the circumferential direction is smaller than the average value of the diffuser radius in a range from 180° to 360° in the circumferential direction.

13 Claims, 8 Drawing Sheets

(51) Int. Cl.
*F01D 9/02* (2006.01)
*F02B 33/40* (2006.01)
*F04D 29/42* (2006.01)

(52) U.S. Cl.
CPC ...... *F04D 29/4206* (2013.01); *F05D 2220/40* (2013.01); *F05D 2250/52* (2013.01)

(56) References Cited

U.S. PATENT DOCUMENTS

2017/0191502 A1 7/2017 Ozaki et al.
2018/0347382 A1* 12/2018 Iwakiri ................. F04D 29/441
2022/0205458 A1 6/2022 Iwakiri

FOREIGN PATENT DOCUMENTS

WO WO 2016/002037 A1 1/2016
WO WO 2017/109949 A1 6/2017
WO WO-2020240775 A1 * 12/2020 .............. F02B 39/00

OTHER PUBLICATIONS

International Search Report for International Application No. PCT/JP2022/016462, dated Jun. 21, 2022, with English translation.

* cited by examiner

COMPRESSOR COVER, CENTRIFUGAL COMPRESSOR, TURBOCHARGER, METHOD FOR MANUFACTURING COMPRESSOR COVER, AND DIFFUSER FOR CENTRIFUGAL COMPRESSOR

TECHNICAL FIELD

The present disclosure relates to a compressor cover, a centrifugal compressor, a turbocharger, a method for manufacturing a compressor cover, and a diffuser for a centrifugal compressor.

BACKGROUND ART

For example, as described in PTL 1, the centrifugal compressor includes an impeller, a scroll flow path formed on an outer peripheral side of the impeller, and a diffuser flow path that guides a fluid that has passed through the impeller to the scroll flow path.

CITATION LIST

Patent Literature

[PTL 1] Japanese Unexamined Patent Application Publication No. 2016-108994

SUMMARY OF INVENTION

Technical Problem

In the centrifugal compressor, since the scroll flow path on the outer peripheral side of the impeller has an asymmetric shape in a circumferential direction, as shown in FIG. 11, a local low speed region may be formed in the scroll flow path, and thus a backflow may occur in the diffuser flow path. As a countermeasure against such a phenomenon, for example, when a diffuser radius, which is a distance between an outlet of the diffuser flow path and a rotational axis of the impeller, is reduced, a load on the diffuser flow path is reduced. Therefore, the formation of the local low speed region and the occurrence of backflow in the diffuser flow path can be suppressed.

Meanwhile, when the diffuser radius is reduced, while it is possible to suppress the formation of the local low speed region in the scroll flow path and the occurrence of backflow in the diffuser flow path to expand an operating range of the centrifugal compressor to a low flow rate side, a pressure recovery in the diffuser flow path is suppressed and compressor efficiency is reduced.

In view of the above circumstances, an object of at least one embodiment of the present disclosure is to provide a compressor cover, a centrifugal compressor, a turbocharger, a method for manufacturing a compressor cover, and a diffuser for a centrifugal compressor, which can realize a centrifugal compressor that can be operated in a wide operating range with high efficiency.

Solution to Problem

In order to achieve the above object, a compressor cover according to at least one embodiment of the present disclosure is an annular compressor cover that forms a flow path wall of a diffuser flow path in a centrifugal compressor, in which, when a position of a winding end of a scroll flow path of the centrifugal compressor is defined as a position of 360° in a circumferential direction of the compressor cover, a direction in which a fluid in the scroll flow path flows in the circumferential direction is defined as a positive direction of a position in the circumferential direction, and a distance between an outlet of the diffuser flow path and a central axis of an inner peripheral surface of the compressor cover for each position in the circumferential direction is defined as a diffuser radius, an average value of the diffuser radiuses in a range from a position of a tongue portion of the scroll flow path to 180° in the circumferential direction is smaller than an average value of the diffuser radiuses in a range from 180° to 360° in the circumferential direction.

In order to achieve the above object, a centrifugal compressor according to at least one embodiment of the present disclosure includes an impeller, and the above-described compressor cover.

In order to achieve the above object, a turbocharger according to at least one embodiment of the present disclosure includes the above-described centrifugal compressor.

In order to achieve the above object, a method for manufacturing a compressor cover according to at least one embodiment of the present disclosure is a method for manufacturing a compressor cover that forms a flow path wall of a diffuser flow path in a centrifugal compressor, the method including a step of manufacturing an intermediate formed article of the compressor cover, and a step of cutting an edge portion defining an outlet of the diffuser flow path in the intermediate formed article of the compressor cover while rotating the intermediate formed article of the compressor cover around a rotational axis eccentric from a central axis of an inner peripheral surface of the compressor cover.

In order to achieve the above object, a diffuser for a centrifugal compressor according to at least one embodiment of the present disclosure includes a shroud side wall portion, and a hub side wall portion that faces the shroud side wall portion and that forms an annular diffuser flow path between the shroud side wall portion and the hub side wall portion, in which, when a position of a winding end of the diffuser of the centrifugal compressor is defined as a position of 360° in a circumferential direction of the compressor cover, a direction in which a fluid in the scroll flow path flows in the circumferential direction is defined as a positive direction of a position in the circumferential direction, and a distance between an outlet of the diffuser flow path and a rotational axis of an impeller of the centrifugal compressor for each position in the circumferential direction is defined as a diffuser radius R, an average value of the diffuser radiuses in a range from a position of a tongue portion of the scroll flow path to 180° in the circumferential direction is smaller than an average value of the diffuser radiuses in a range from 180° to 360° in the circumferential direction.

Advantageous Effects of Invention

According to at least one embodiment of the present disclosure, there are provided a compressor cover, a centrifugal compressor, a turbocharger, a method for manufacturing a compressor cover, and a diffuser for a centrifugal compressor, which can realize a centrifugal compressor that can be operated in a wide operating range with high efficiency.

DESCRIPTION OF EMBODIMENTS

Figure 1:
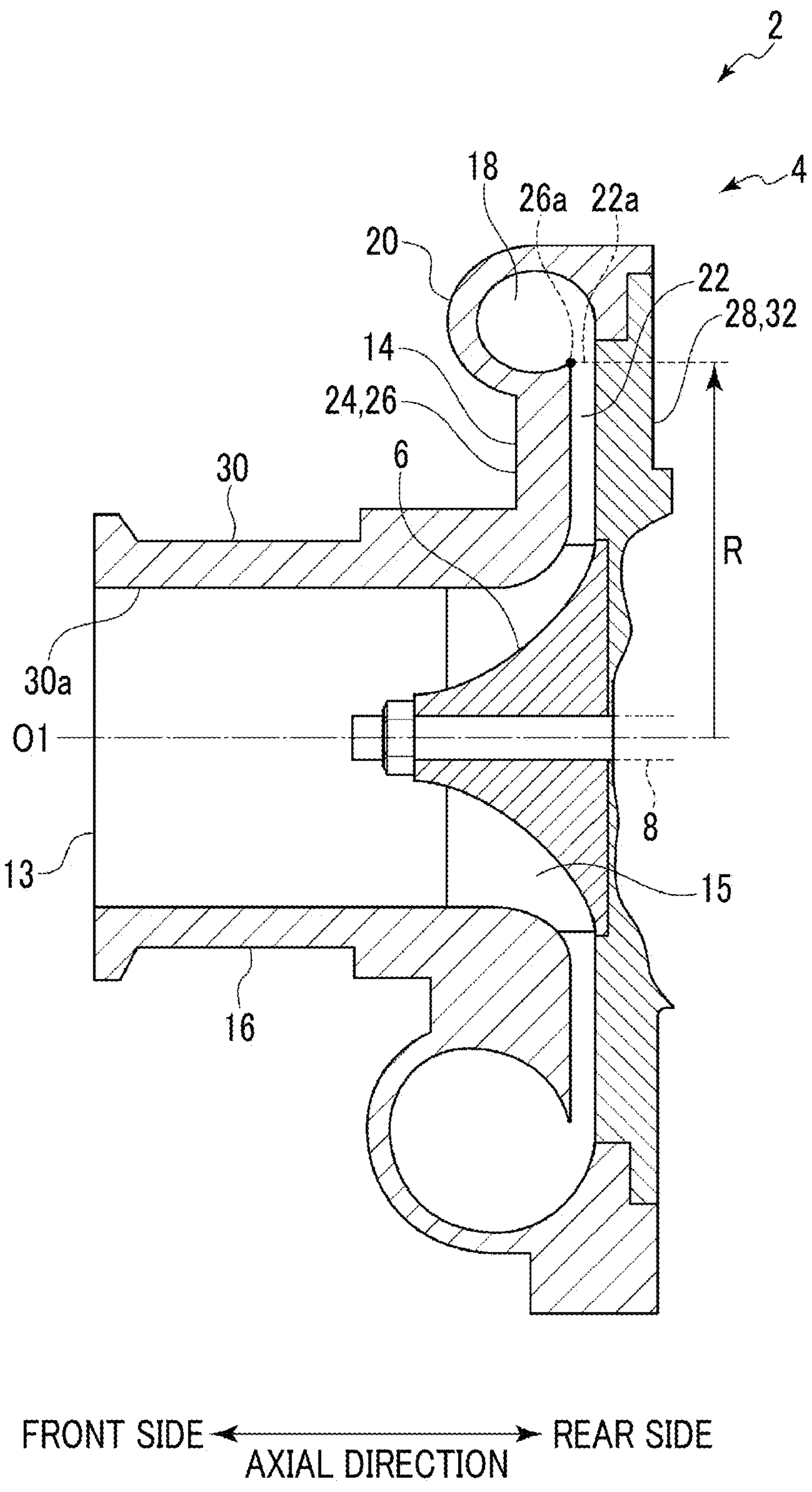
FIG. 1 is a partial sectional view showing a schematic configuration of a turbocharger including a centrifugal compressor according to an embodiment.

Hereinafter, some embodiments of the present disclosure will be described with reference to the accompanying drawings. Dimensions, materials, shapes, relative arrangements, and the like of components described as embodiments or illustrated in the drawings are not intended to limit the scope of the invention, but are merely explanatory examples.

For example, an expression representing a relative or absolute arrangement such as “in a certain direction”, “along a certain direction”, “parallel”, “orthogonal”, “center”, “concentric”, or “coaxial” does not strictly represent only such an arrangement, but also a tolerance or a state of being relatively displaced with an angle or a distance to the extent that the same function can be obtained.

For example, expressions such as “identical”, “equal”, and “homogeneous”, which indicate that things are in the same state, not only represent a state of being strictly equal, but also represent a state in which there is a tolerance, or a difference to the extent that the same function can be obtained.

For example, an expression indicating a shape such as a square shape or a cylindrical shape not only represents a shape such as a square shape or a cylindrical shape in a geometrically strict sense, but also represents a shape that includes concave and convex portions, chamfered portions, or the like to the extent that the same effects can be obtained.

Meanwhile, an expression such as “comprising”, “possessing”, “provided with”, “including”, or “having” one component is not an exclusive expression excluding the presence of other components.

(Schematic Configuration of Turbocharger)

FIG. 1 is a partial sectional view showing a schematic configuration of a turbocharger 2 including a centrifugal compressor 4 according to an embodiment.

As shown in FIG. 1, the turbocharger 2 includes the centrifugal compressor 4 and a turbine (not shown) connected to the centrifugal compressor 4 via a rotary shaft 8. The centrifugal compressor 4 includes an impeller 6 and a casing 14 that accommodates the impeller 6.

Hereinafter, an “axial direction” means an axial direction of the impeller 6 unless otherwise specified, a “radial direction” means a radial direction of the impeller 6 unless otherwise specified, and a “circumferential direction” means a circumferential direction of the impeller 6 unless otherwise specified. In addition, an air inlet 13 side of the centrifugal compressor 4 in the axial direction is referred to as a “front side”, and a side opposite to the front side in the axial direction is referred to as a “rear side”.

The casing 14 includes a tubular portion 16 that guides air to the impeller 6 and that forms an impeller accommodation space 15 accommodating the impeller 6, a scroll portion 20 that forms a scroll flow path 18 on an outer peripheral side of the impeller 6, and a diffuser portion 24 (diffuser) that forms an annular diffuser flow path 22 connecting the impeller accommodation space 15 and the scroll flow path 18.

The diffuser portion 24 includes a shroud side wall portion 26 that is formed on the outer peripheral side of the impeller 6 along a plane orthogonal to the axial direction, and a hub side wall portion 28 that is positioned on a rear side of the shroud side wall portion 26 and that is formed on the outer peripheral side of the impeller 6 along the plane orthogonal to the axial direction to face the shroud side wall portion 26. The diffuser flow path 22 is formed between the shroud side wall portion 26 and the hub side wall portion 28. That is, the diffuser flow path 22 is defined by the shroud side wall portion 26 and the hub side wall portion 28.

In a shown exemplary form, the casing 14 includes an annular compressor cover 30 and an annular bearing casing 32. In addition, the tubular portion 16, the shroud side wall portion 26 of the diffuser portion 24, and a part of the scroll portion 20 are integrally formed to form the compressor cover 30. In addition, the hub side wall portion 28 is configured by a part of the bearing casing 32 for accommodating a bearing (not shown) that supports the rotary shaft 8. The compressor cover 30 and the bearing casing 32 are fastened to each other by a fastener such as a bolt (not shown).

In addition, as will be described in detail later, a distance R between an outlet **22*a* of the diffuser flow path 22 and a central axis O1 of an inner peripheral surface 30*a* of a compressor cover in the centrifugal compressor 4 changes according to a position in the circumferential direction. Hereinafter, the distance R between the outlet 22***a* of the diffuser flow path 22 and the central axis O1 of the inner peripheral surface 30*a* of the compressor cover 30 for each position in the circumferential direction will be referred to as a "diffuser radius R".

The central axis O1 of the inner peripheral surface 30*a* of the annular compressor cover 30 coincides with a rotational axis O1 of the impeller 6, an axial direction of the compressor cover 30 coincides with the axial direction of the impeller 6 and an axial direction of the diffuser portion 24, a radial direction of the compressor cover 30 coincides with the radial direction of the impeller 6 and a radial direction of the diffuser portion 24, and a circumferential direction of the compressor cover 30 coincides with the circumferential direction of the impeller 6 and a circumferential direction of the diffuser portion 24. In addition, at each position in the circumferential direction, the diffuser radius R corresponds to a distance between the outlet 22*a* of the diffuser flow path 22 and the rotational axis O1 of the impeller 6. In addition, the outlet 22*a* of the diffuser flow path 22 means a boundary between the diffuser flow path 22 and the scroll flow path 18, and more specifically, means an opening end formed in the diffuser flow path 22 at a position of an outer end 26*a* (hereinafter, referred to as an outer peripheral edge 26*a* of the shroud side wall portion 26 in some cases) of the shroud side wall portion 26 in the radial direction. In addition, the diffuser radius R corresponds to a distance between the outer end 26*a* of the shroud side wall portion 26 and the central axis O1 in the radial direction.

(Configuration Example of Diffuser Flow Path and Scroll Flow Path)

Hereinafter, some examples of configurations of the scroll flow path 18 and the diffuser flow path 22 will be described.

Figure 2:
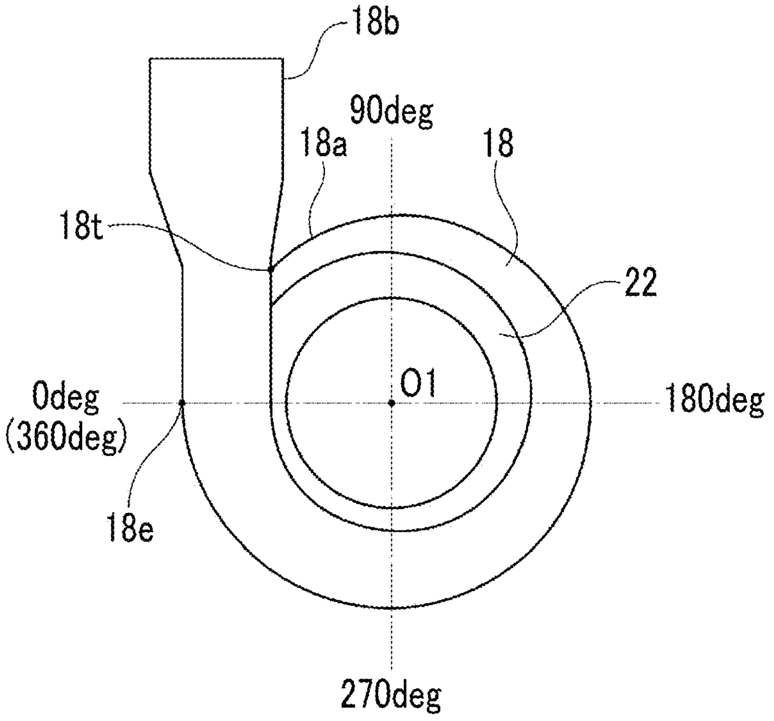
FIG. 2 is a diagram for describing a definition of a position in a circumferential direction.

FIG. 2 is a diagram for describing a definition of the position (angular position) in the circumferential direction.

As shown in FIG. 2, in the following description, a position of a winding end 18*e* of the scroll flow path 18 is defined as a position of 360° (that is, 0°) in the circumferential direction, and a direction in which an exhaust gas (fluid) in the scroll flow path 18 flows in the circumferential direction is defined as a positive direction of the position in the circumferential direction. A position of a tongue portion 18*t* of the scroll flow path 18 in the circumferential direction may be approximately 60° (for example, a position between 45° and 75°). As is well known to those skilled in the art, the position of the tongue portion 18*t* of the scroll flow path 18 means a position of a tip end of a tongue-shaped protrusion shape formed at a position where a winding start portion 18*a* and a discharge portion 18*b* in the scroll flow path 18 are connected to each other. The direction in which the exhaust gas in the scroll flow path 18 flows in the circumferential direction coincides with a rotation direction of the impeller 6 (refer to FIG. 1).

Figure 3:
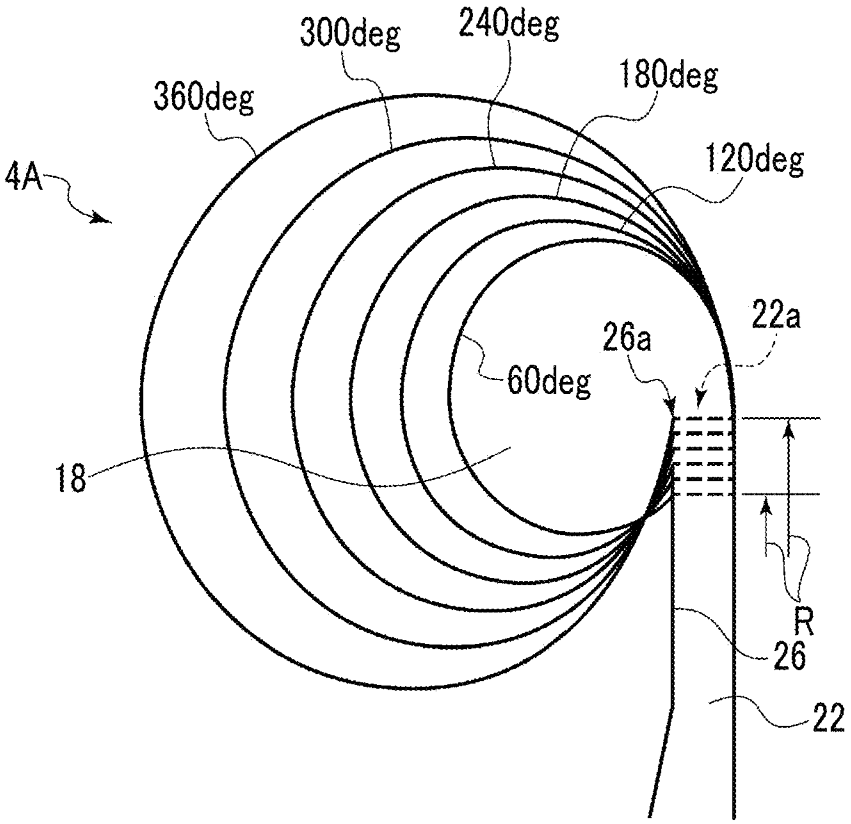
FIG. 3 is a diagram showing a change in a flow path cross section (cross section along an axial direction in a scroll flow path and a diffuser flow path) on a downstream side of an impeller every 60° from 0° to 360° in the circumferential direction for an example of the centrifugal compressor.

FIG. 3 is a diagram showing a change in a flow path cross section (cross section along the axial direction in the scroll flow path 18 and the diffuser flow path 22) on a downstream side of the impeller 6 every 60° from 60° to 360° in the circumferential direction for a centrifugal compressor 4A, which is an example of the centrifugal compressor 4.

As shown in FIG. 3, in the centrifugal compressor 4A, a flow path cross-sectional area of the scroll flow path 18 gradually increases from 60° to 360° in the circumferential direction. In addition, a position of the outlet 22*a* of the diffuser flow path 22 changes according to the position in the circumferential direction, and the position of the outlet 22*a* changes from an inner side to an outer side in the radial direction in order of 60°, 120°, 180°, 240°, and 360° (0°).

Figure 4:
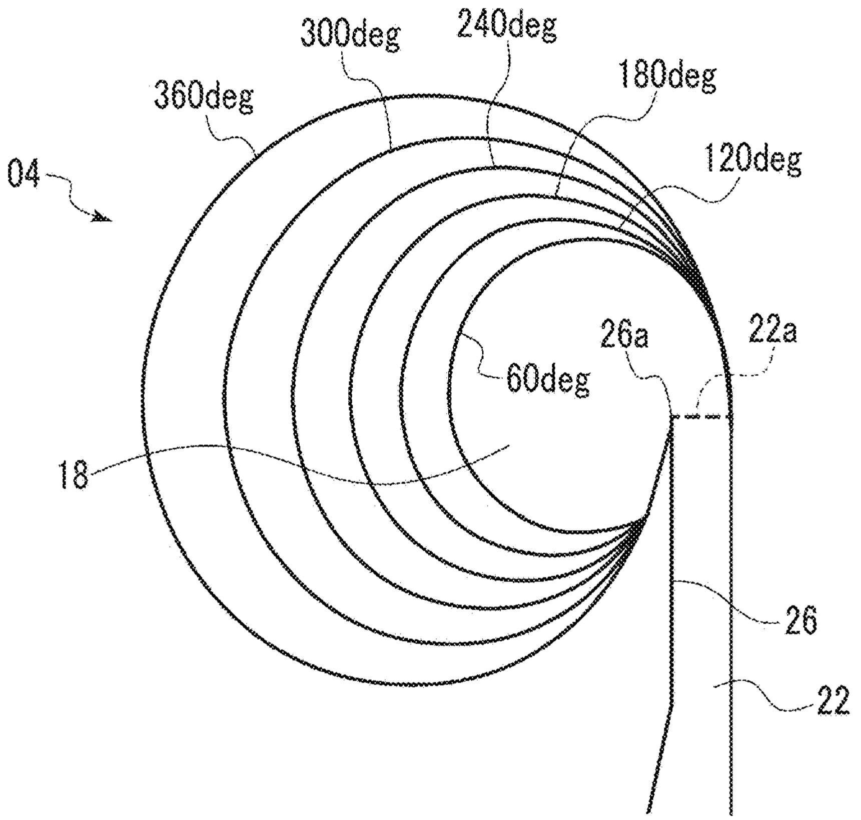
FIG. 4 PRIOR ART
FIG. 4 is a diagram showing the change in the flow path cross section (cross section along the axial direction in the scroll flow path and the diffuser flow path) on a position of the impeller every 60° from 0° to 360° in the circumferential direction for a centrifugal compressor according to a comparative example.

FIG. 4 is a diagram showing the change in the flow path cross section (cross section along the axial direction in the scroll flow path 18 and the diffuser flow path 22) on the downstream side of the impeller 6 every 60° from 60° to 360° in the circumferential direction for a centrifugal compressor 04 according to a comparative example.

As shown in FIG. 4, also in the centrifugal compressor 04, the flow path cross-sectional area of the scroll flow path 18 gradually increases from 60° to 360° in the circumferential direction. In addition, in the centrifugal compressor 04, a radial position of the outlet 22*a* of the diffuser flow path 22 is constant regardless of the position in the circumferential direction. That is, in the centrifugal compressor 04, the outlet 22*a* of the diffuser flow path 22 has a circular shape when viewed in an axial direction, in other words, the outer peripheral edge 26*a* of the shroud side wall portion 26 has a circular shape.

Figure 5:
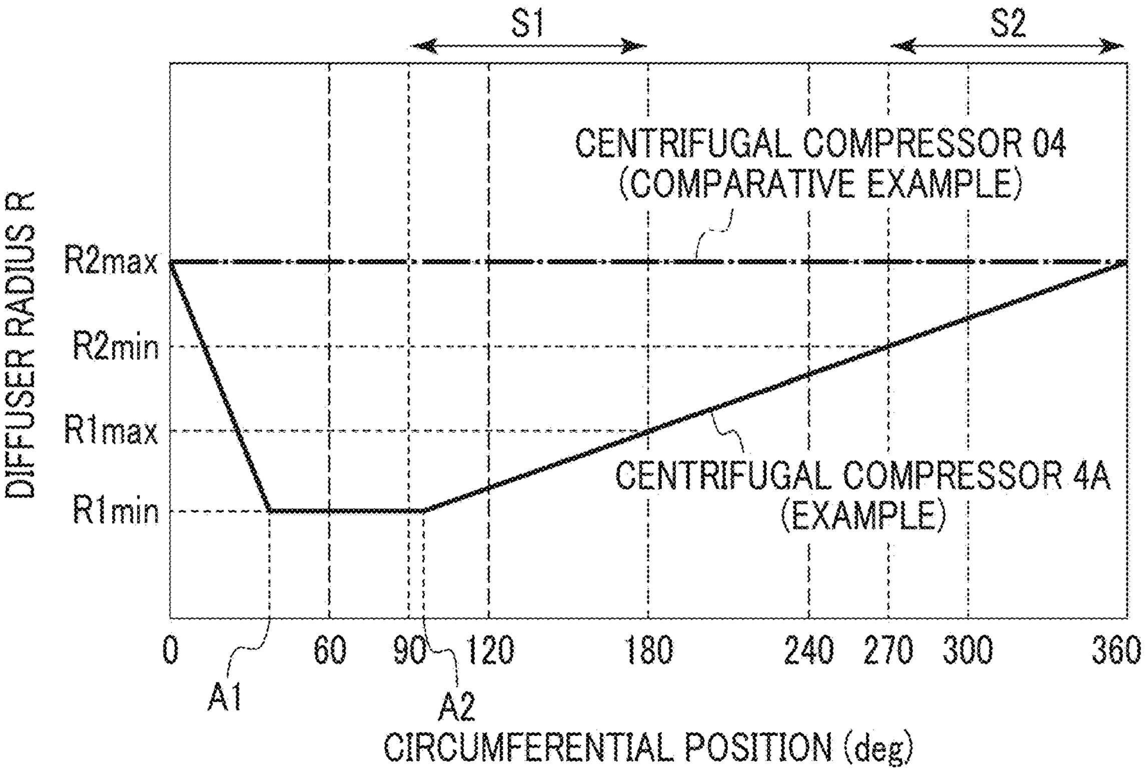
FIG. 5 is a graph showing a relationship between the position in the circumferential direction and a diffuser radius in each of the centrifugal compressor according to the embodiment and the centrifugal compressor according to the comparative example.

FIG. 5 is a graph showing a relationship between the position in the circumferential direction and the diffuser radius R in each of the centrifugal compressor 4A and the centrifugal compressor 04. In the graph shown in FIG. 5, the position in the circumferential direction is represented on a horizontal axis and the diffuser radius R is represented on a vertical axis.

As shown in FIG. 5, in the centrifugal compressor 04 according to the comparative example, the diffuser radius R is constant regardless of the position in the circumferential direction. In contrast, in the centrifugal compressor 4A, the diffuser radius R changes according to the position in the circumferential direction. In the exemplary centrifugal compressor 4A shown in FIG. 5, in the circumferential direction, the diffuser radius R linearly decreases from 0° to a position A1, is a constant value (=R1min) from the position A1 to a position A2, and linearly increases from the position A2 to 360°. In an example shown in the drawing, the position A1 is a position of 0° or more and 60° or less in the circumferential direction, and the position A2 is a position of 90° or more and 120° or less in the circumferential direction.

In the example shown in FIG. 5, the diffuser radius R changes according to the position in the circumferential direction, and a minimum value R1min of the diffuser radius R is taken in at least a part of a range from 0° to 180° in the circumferential direction. In addition, the diffuser radius R may take the minimum value R1min of the diffuser radius R in at least a part of a range from 45° to 180° in the circumferential direction. In addition, the diffuser radius R may take the minimum value R1min of the diffuser radius R in at least a part of a range from 60° to 180° in the circumferential direction. In addition, the diffuser radius R may take the minimum value R1min of the diffuser radius R in at least a part of a range from 90° to 180° in the circumferential direction.

In addition, as shown in FIG. 5, when the range from 90° to 180° in the circumferential direction is defined as a first range S1, in the centrifugal compressor 4A, the diffuser radius R in at least a part of the first range S1 in the circumferential direction is smaller than the diffuser radius R in at least a part of a range excluding the first range S1 in the circumferential direction. The range excluding the first range S1 in the circumferential direction means a range excluding the range from 90° to 180° from a range from 0° to 360° in the circumferential direction, in other words, means a range excluding a position of 90° and a position of 180° from a range from 0° to 90° and a range from 180° to 360° in the circumferential direction.

In addition, as shown in FIG. 5, in the centrifugal compressor 4A, a maximum value R1max of the diffuser radius R in the first range S1 in the circumferential direction is smaller than a maximum value R2max of the diffuser radius R in the range excluding the first range S1 in the circumferential direction. In addition, in the centrifugal compressor 4A, an average value R1ave (not shown) of the diffuser radiuses R in the first range S1 in the circumferential direction is smaller than an average value R0ave (not shown) of the diffuser radiuses R in the range excluding the first range S1 in the circumferential direction.

In addition, in the centrifugal compressor 4A, an average value of the diffuser radiuses R in a range from the position of the tongue portion 18*t* of the scroll flow path 18 to 180° in the circumferential direction is smaller than an average value of the diffuser radiuses R in the range from 180° to 360° in the circumferential direction. In addition, an average value of the diffuser radiuses R in the first range S1 in the circumferential direction is smaller than an average value of the diffuser radiuses R in the range from 180° to 360° in the circumferential direction. In addition, the maximum value R1max of the diffuser radius R in the first range S1 in the circumferential direction is smaller than a minimum value of the diffuser radius R in a range excluding the position of 180° of the range from 180° to 360° in the circumferential direction. In addition, the maximum value R1max of the diffuser radius R in the first range S1 in the circumferential direction is smaller than the maximum value R2max of the diffuser radius R in the range from 180° to 360° in the circumferential direction. The minimum value R1min of the diffuser radius R in the range from 90° to 180° in the circumferential direction is smaller than a minimum value R1max of the diffuser radius R in the range from 180° to 360° in the circumferential direction.

In addition, when a range from 270° to 360° in the circumferential direction is defined as a second range S2, in the centrifugal compressor 4A, the diffuser radius R in at least a part of the first range S1 in the circumferential direction is smaller than the diffuser radius R in at least a part of the second range S2 in the circumferential direction. In addition, in the centrifugal compressor 4A, the maximum value R1max of the diffuser radius R in the first range S1 in the circumferential direction is smaller than the maximum value R2max of the diffuser radius R in the second range S2 in the circumferential direction. In addition, in the centrifugal compressor 4A, the minimum value R1min of the diffuser radius R in the first range S1 in the circumferential direction is smaller than a minimum value R2min of the diffuser radius R in the second range S2 in the circumferential direction. In addition, in the centrifugal compressor 4A, an average value R1ave (not shown) of the diffuser radiuses R in the first range S1 in the circumferential direction is smaller than a minimum value R2ave (not shown) of the diffuser radius R in the second range S2 in the circumferential direction. In addition, the maximum value R1max of the diffuser radius R in the first range S1 in the circumferential direction is smaller than the minimum value R2min of the diffuser radius R in the second range S2 in the circumferential direction. In addition, the diffuser radius R in at least a part of the first range S1 in the circumferential direction takes the minimum value R1min of the diffuser radius R in the range from 0° to 360° in the circumferential direction. That is, the diffuser radius R is minimized in at least a part of the first range S1 in the circumferential direction.

In addition, in the centrifugal compressor 4A, the average value of the diffuser radiuses R in the range from the position of the tongue portion 18*t* of the scroll flow path 18 to 180° in the circumferential direction is smaller than an average value of the diffuser radiuses R in the second range S2 in the circumferential direction. In addition, the average value of the diffuser radiuses R in the first range S1 in the circumferential direction is smaller than the average value of the diffuser radiuses R in the second range S2 in the circumferential direction. In addition, the maximum value R1max of the diffuser radius R in the first range S1 in the circumferential direction is smaller than the minimum value R2min of the diffuser radius R in the second range S2 in the circumferential direction. In addition, the maximum value R1max of the diffuser radius R in the first range S1 in the circumferential direction is smaller than the maximum value R2max of the diffuser radius R in the second range S2 in the circumferential direction. In addition, the minimum value R1min of the diffuser radius R in the first range S1 in the circumferential direction is smaller than the minimum value R2min of the diffuser radius R in the second range S2 in the circumferential direction.

In addition, in the centrifugal compressor 4A, in at least a part of the range from 0° to 90° in the circumferential direction, the diffuser radius R decreases toward the positive direction in the circumferential direction, and in at least a part of a range from 180° to 270° in the circumferential direction, the diffuser radius R increases toward the positive direction in the circumferential direction.

Hereinafter, an effect of the centrifugal compressor 4A will be described.

Figure 11:
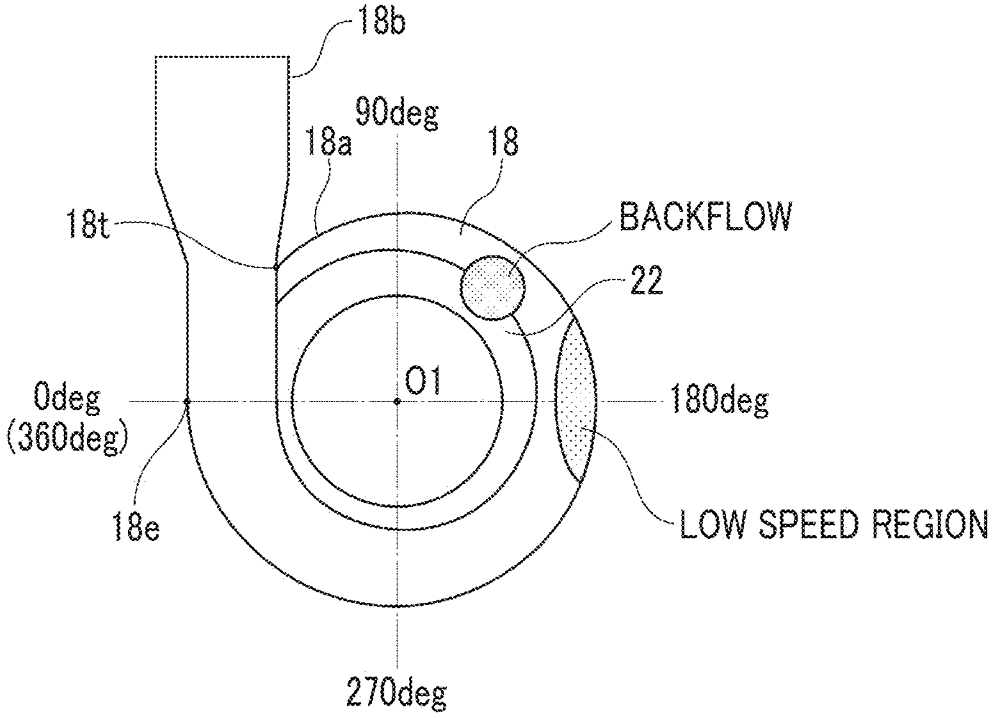
PRIOR ART FIG. 11
FIG. 11 is a diagram showing a radial flow speed in a vicinity of a hub side wall surface on the downstream side of the impeller of a centrifugal compressor in the related art.

In general, in the centrifugal compressor, since the scroll flow path on the outer peripheral side of the impeller has an asymmetric shape in the circumferential direction, a local low speed region (stall region) may be formed in the scroll flow path, and thus a backflow may occur in the diffuser flow path. Regarding this phenomenon, as a result of the inventor of the present application making an intensive study, it has been clarified that the backflow is likely to occur in the diffuser flow path, particularly in the range from 90° to 180° in the circumferential direction (the above-described first range S1) as shown in FIG. 11. In addition, it has been clarified that the backflow is unlikely to occur in the diffuser flow path in the range from 270° to 360° in the circumferential direction (the above-described second range S2).

Therefore, in the centrifugal compressor 4A, as described above, the average value of the diffuser radiuses R in the range from the position of the tongue portion 18*t* of the scroll flow path 18 to 180° in the circumferential direction is smaller than the average value of the diffuser radiuses R in the range from 180° to 360° in the circumferential direction. Accordingly, it is possible to reduce a load on the diffuser flow path 22 in the range from the position of the tongue portion 18*t* to 180°, which is a range including a place where the stall region is likely to occur in the circumferential direction (range from 90° to 180°), more than the load on the diffuser flow path 22 in the range from 180° to 360° in the circumferential direction. Therefore, it is possible to suppress the formation of the local low speed region and the occurrence of the backflow in the diffuser flow path 22, and to expand an operating range of the centrifugal compressor 4A to a low flow rate side. In addition, compared to a case where the diffuser radius R is uniformly reduced from 0° to 360°, it is possible to promote a pressure recovery in the diffuser flow path 22 in the range from 180° to 360° in the circumferential direction. Therefore, it is possible to suppress a decrease in compressor efficiency. Therefore, it is possible to realize the centrifugal compressor 4A that can be operated in a wide operating range with high efficiency.

In addition, in the centrifugal compressor 4A, as described above, the compressor cover 30 is configured such that the average value of the diffuser radiuses R in the first range S1 from 90° to 180° in the circumferential direction is smaller than the average value of the diffuser radiuses R in the range from 180° to 360° in the circumferential direction. Accordingly, it is possible to reduce a load on the diffuser flow path 22 in the first range S1 from 90° to 180°, which is the place where the stall region is likely to occur in the circumferential direction, more than the load on the diffuser flow path 22 in the range from 180° to 360° in the circumferential direction. Therefore, it is possible to suppress the formation of the local low speed region and the occurrence of the backflow in the diffuser flow path 22, and to expand the operating range of the centrifugal compressor 4A to the low flow rate side. In addition, compared to the case where the diffuser radius R is uniformly reduced from 0° to 360°, it is possible to promote the pressure recovery in the diffuser flow path 22 in at least a part of the range excluding the first range S1 in the circumferential direction. Therefore, it is possible to suppress the decrease in the compressor efficiency. Therefore, it is possible to realize the centrifugal compressor 4A that can be operated in a wide operating range with high efficiency.

In addition, in the centrifugal compressor 4A, the compressor cover 30 is configured such that the average value R1ave of the diffuser radiuses R in the first range S1 from 90° to 180° in the circumferential direction is smaller than the average value R0ave of the diffuser radiuses R in the range excluding the first range S1 in the circumferential direction. Accordingly, it is possible to reduce the load on the diffuser flow path 22 in the first range S1 from 90° to 180°, which is the place where the stall region is likely to occur in the circumferential direction, more than the load on the diffuser flow path 22 in the range excluding the first range in the circumferential direction. Therefore, it is possible to enhance an effect of expanding the operating range of the centrifugal compressor 4A to the low flow rate side and an effect of suppressing the decrease in the compressor efficiency.

In addition, in the centrifugal compressor 4A, the compressor cover 30 is configured such that the maximum value R1max of the diffuser radius R in the first range S1 from 90° to 180° in the circumferential direction is smaller than the maximum value R2max of the diffuser radius R in the range excluding the first range S1 in the circumferential direction. Therefore, it is possible to enhance the effect of expanding the operating range of the centrifugal compressor 4A to the low flow rate side and the effect of suppressing the decrease in the compressor efficiency.

In addition, in the centrifugal compressor 4A, the compressor cover 30 is configured such that the diffuser radius R in at least a part of the first range S1 from 90° to 180° in the circumferential direction is smaller than the diffuser radius R in at least a part of the second range S2 from 270° to 360° in the circumferential direction. Accordingly, it is possible to reduce the load on the diffuser flow path 22 in at least a part of the first range S1 from 90° to 180°, which is the place where the stall region is likely to occur in the circumferential direction, more than the load on the diffuser flow path 22 in at least a part of the second range S2 from 270° to 360°, which is a place where the stall region is unlikely to occur in the circumferential direction (region where the flow is normal). Therefore, it is possible to suppress the formation of the local low speed region and the occurrence of the backflow in the diffuser flow path 22, and to expand the operating range of the centrifugal compressor 4A to the low flow rate side. In addition, compared to the case where the diffuser radius R is uniformly reduced from 0° to 360°, it is possible to promote the pressure recovery in the diffuser flow path 22 in the second range S2 from 270° to 360° in the circumferential direction. Therefore, it is possible to suppress the decrease in the compressor efficiency. Therefore, it is possible to realize the centrifugal compressor 4A that can be operated in a wide operating range with high efficiency.

In addition, in the centrifugal compressor 4A, the compressor cover 30 is configured such that the average value R1ave of the diffuser radiuses R in the first range S1 from 90° to 180° in the circumferential direction is smaller than the average value R2ave of the diffuser radiuses R in the second range S2 from 270° to 360° in the circumferential direction. Accordingly, it is possible to reduce the load on the diffuser flow path 22 in the first range S1 from 90° to 180°, which is the place where the stall region is likely to occur in the circumferential direction, more than the load on the diffuser flow path 22 in the second range S2 from 270° to 360°, which is a place where the stall region is unlikely to occur in the circumferential direction (region where the flow is normal). Therefore, it is possible to enhance an effect of expanding the operating range of the centrifugal compressor 4A to the low flow rate side and an effect of suppressing the decrease in the compressor efficiency.

In addition, in the centrifugal compressor 4A, the compressor cover 30 is configured such that the maximum value R1max of the diffuser radius R in the first range S1 from 90° to 180° in the circumferential direction is smaller than the maximum value R2max of the diffuser radius R in the second range from 270° to 360° in the circumferential direction. Therefore, it is possible to enhance the effect of expanding the operating range of the centrifugal compressor 4A to the low flow rate side and the effect of suppressing the decrease in the compressor efficiency.

In addition, in the centrifugal compressor 4A, the compressor cover 30 is configured such that the minimum value R1min of the diffuser radius R in the first range S1 from 90° to 180° in the circumferential direction is smaller than the minimum value R2min of the diffuser radius R in the second range from 270° to 360° in the circumferential direction. Therefore, it is possible to enhance the effect of expanding the operating range of the centrifugal compressor 4A to the low flow rate side and the effect of suppressing the decrease in the compressor efficiency.

Figure 6:
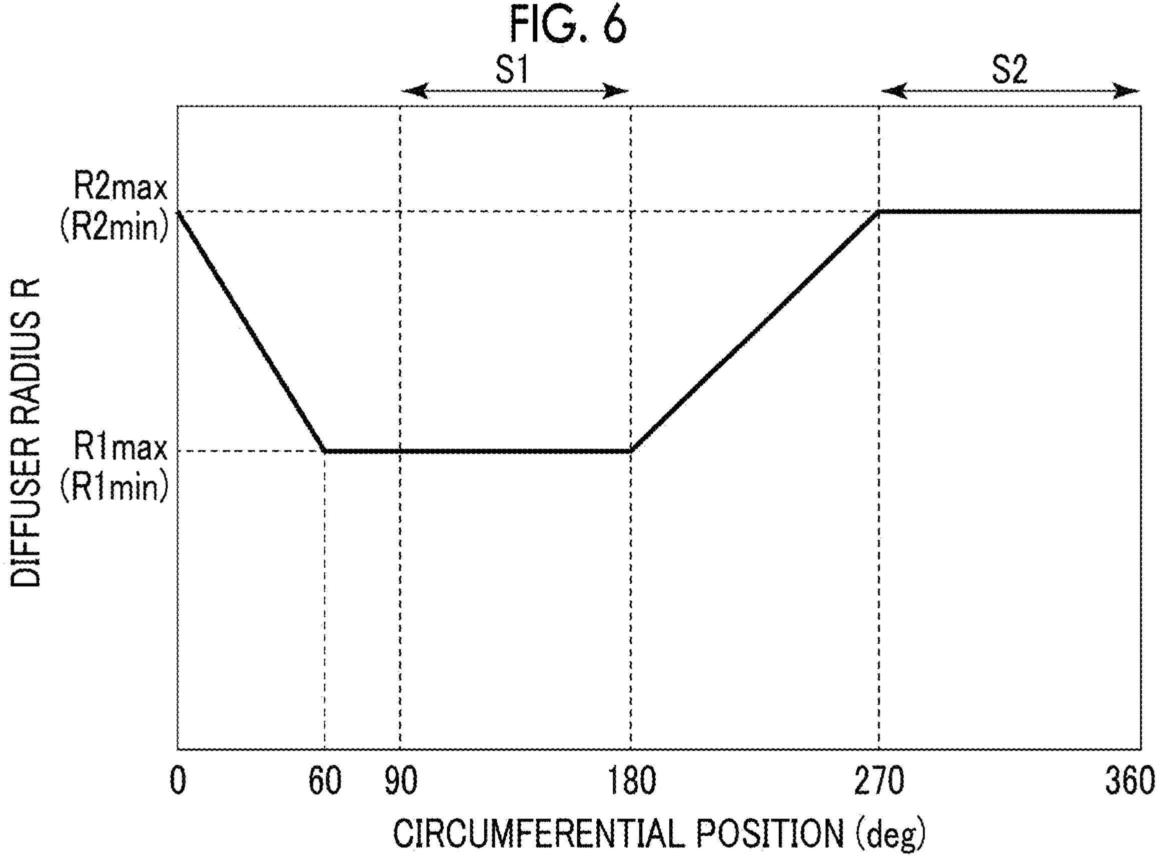
FIG. 6 is a graph showing the relationship between the position in the circumferential direction and the diffuser radius in a centrifugal compressor according to another embodiment.

FIG. 6 is a graph showing the relationship between the position in the circumferential direction and the diffuser radius R in a centrifugal compressor 4B according to another embodiment. In the graph shown in FIG. 6, the position in the circumferential direction is represented on a horizontal axis and the diffuser radius R is represented on a vertical axis.

In the exemplary centrifugal compressor 4B shown in FIG. 6, in the circumferential direction, the diffuser radius R linearly decreases from 0° to 60°, is a constant value (=R1max, R1min) from 60° to 180°, linearly increases from 180° to 270°, and is a constant value (=R2max, R2min) from 270° to 360°.

Also in the centrifugal compressor 4B shown in FIG. 6, the diffuser radius R changes according to the position in the circumferential direction, and the minimum value R1min of the diffuser radius R is taken in at least a part of the range from 0° to 180° in the circumferential direction. In addition, the diffuser radius R may take the minimum value R1min of the diffuser radius R in at least a part of a range from 45° to 180° in the circumferential direction. In addition, the diffuser radius R may take the minimum value R1min of the diffuser radius R in at least a part of a range from 60° to 180° in the circumferential direction. In addition, the diffuser radius R may take the minimum value R1min of the diffuser radius R in at least a part of a range from 90° to 180° in the circumferential direction.

Also in the centrifugal compressor 4B shown in FIG. 6, when the range from 90° to 180° in the circumferential direction is defined as the first range S1, in the centrifugal compressor 4B, the diffuser radius R in at least a part of the first range S1 in the circumferential direction is smaller than the diffuser radius R in at least a part of the range excluding the first range S1 in the circumferential direction.

In addition, also in the centrifugal compressor 4B, the maximum value R1max of the diffuser radius R in the first range S1 in the circumferential direction is smaller than the maximum value R2max of the diffuser radius R in the range excluding the first range S1 in the circumferential direction. In addition, the average value R1ave (not shown) of the diffuser radiuses R in the first range S1 in the circumferential direction is smaller than the average value R0ave (not shown) of the diffuser radiuses R in the range excluding the first range S1 in the circumferential direction.

In addition, also in the centrifugal compressor 4B, the average value of the diffuser radiuses R in a range from the position of the tongue portion 18*t* of the scroll flow path 18 to 180° in the circumferential direction is smaller than the average value of the diffuser radiuses R in the range from 180° to 360° in the circumferential direction. In addition, an average value of the diffuser radiuses R in the first range S1 in the circumferential direction is smaller than an average value of the diffuser radiuses R in the range from 180° to 360° in the circumferential direction. In addition, the maximum value R1max of the diffuser radius R in the first range S1 in the circumferential direction is smaller than a minimum value of the diffuser radius R in a range excluding the position of 180° of the range from 180° to 360° in the circumferential direction. In addition, the maximum value R1max of the diffuser radius R in the first range S1 in the circumferential direction is smaller than the maximum value R2max of the diffuser radius R in the range from 180° to 360° in the circumferential direction. The minimum value R1min of the diffuser radius R in the range from 90° to 180° in the circumferential direction is smaller than a minimum value R1max of the diffuser radius R in the range from 180° to 360° in the circumferential direction.

In addition, also in the centrifugal compressor 4B, when the range from 270° to 360° in the circumferential direction is defined as the second range S2, the diffuser radius R in at least a part of the first range S1 in the circumferential direction is smaller than the diffuser radius R in at least a part of the second range S2 in the circumferential direction. In addition, the maximum value R1max of the diffuser radius R in the first range S1 in the circumferential direction is smaller than the maximum value R2max of the diffuser radius R in the second range S2 in the circumferential direction. In addition, the minimum value R1min of the diffuser radius R in the first range S1 in the circumferential direction is smaller than the minimum value R2min of the diffuser radius R in the second range S2 in the circumferential direction. In addition, the average value R1ave (not shown) of the diffuser radiuses R in the first range S1 in the circumferential direction is smaller than the minimum value R2ave (not shown) of the diffuser radius R in the second range S2 in the circumferential direction. In addition, the maximum value R1max of the diffuser radius R in the first range S1 in the circumferential direction is smaller than the minimum value R2min of the diffuser radius R in the second range S2 in the circumferential direction. In addition, the diffuser radius R in at least a part of the first range S1 in the circumferential direction takes the minimum value R1min of the diffuser radius R in the range from 0° to 360° in the circumferential direction. In addition, in at least a part of the range from 0° to 90° in the circumferential direction, the diffuser radius R decreases toward the positive direction in the circumferential direction, and in at least a part of the range from 180° to 270° in the circumferential direction, the diffuser radius R increases toward the positive direction in the circumferential direction.

In addition, also in the centrifugal compressor 4B, the average value of the diffuser radiuses R in the range from the position of the tongue portion 18*t* of the scroll flow path 18 to 180° in the circumferential direction is smaller than the average value of the diffuser radiuses R in the second range S2 in the circumferential direction. In addition, the average value of the diffuser radiuses R in the first range S1 in the circumferential direction is smaller than the average value of the diffuser radiuses R in the second range S2 in the circumferential direction. In addition, the maximum value R1max of the diffuser radius R in the first range S1 in the circumferential direction is smaller than the minimum value R2min of the diffuser radius R in the second range S2 in the circumferential direction. In addition, the maximum value R1max of the diffuser radius R in the first range S1 in the circumferential direction is smaller than the maximum value R2max of the diffuser radius R in the second range S2 in the circumferential direction. In addition, the minimum value R1min of the diffuser radius R in the first range S1 in the circumferential direction is smaller than the minimum value R2min of the diffuser radius R in the second range S2 in the circumferential direction.

According to the centrifugal compressor 4B, as in the centrifugal compressor 4A, it is possible to realize the centrifugal compressor that can be operated in the wide operating range with high efficiency.

Figure 7:
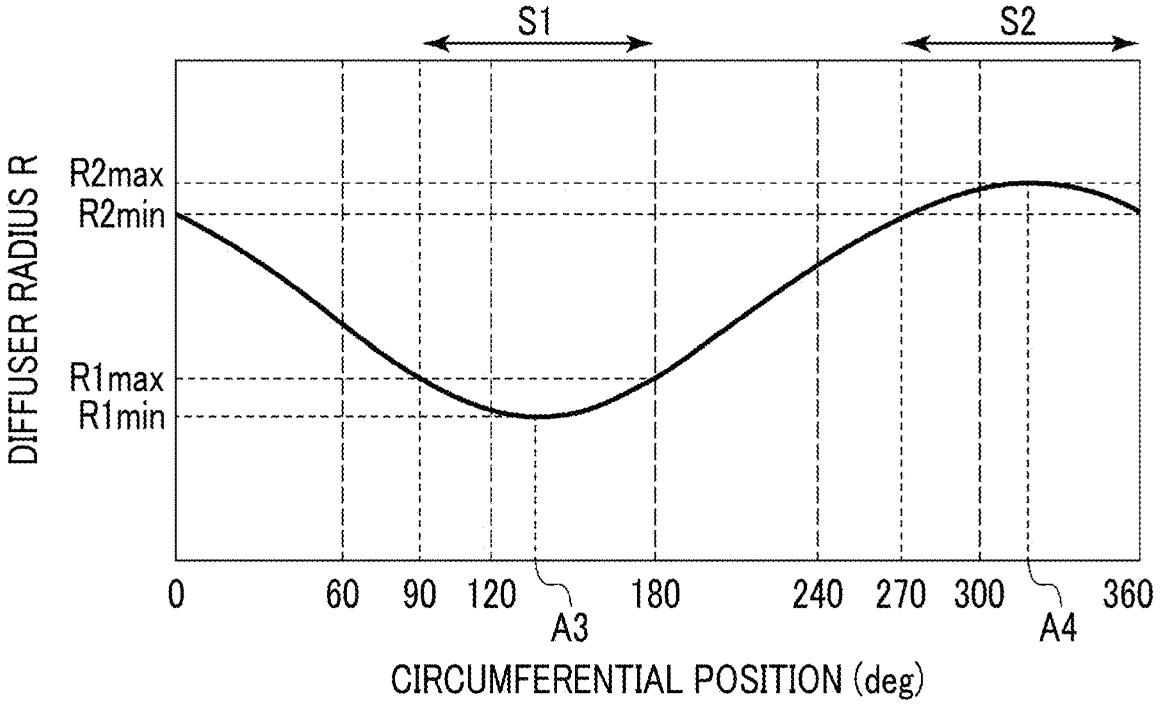
FIG. 7 is a graph showing the relationship between the position in the circumferential direction and the diffuser radius in a centrifugal compressor according to still another embodiment.

FIG. 7 is a graph showing the relationship between the position in the circumferential direction and the diffuser radius R in a centrifugal compressor 4C according to still another embodiment. In the graph shown in FIG. 7, the position in the circumferential direction is represented on a horizontal axis and the diffuser radius R is represented on a vertical axis.

In the exemplary centrifugal compressor 4C shown in FIG. 7, in the circumferential direction, the diffuser radius R decreases from 0° to a position A3, increases from the position A3 to a position A4, and decreases from the position A4 to 360°. In an example shown in the drawing, the position A3 is a position of 90° or more and 180° or less in the circumferential direction (more specifically, a position of 120° or more and 180° or less), and the position A4 is a position of 270° or more and 360° or less in the circumferential direction (more specifically, a position of 300° or more and 360° or less). The graph shown in FIG. 7 is configured by a smooth curve.

Also in the centrifugal compressor 4C shown in FIG. 7, the diffuser radius R changes according to the position in the circumferential direction, and the minimum value R1min of the diffuser radius R is taken in at least a part of the range from 0° to 180° in the circumferential direction. In addition, the diffuser radius R may take the minimum value R1min of the diffuser radius R in at least a part of a range from 45° to 180° in the circumferential direction. In addition, the diffuser radius R may take the minimum value R1min of the diffuser radius R in at least a part of a range from 60° to 180° in the circumferential direction. In addition, the diffuser radius R may take the minimum value R1min of the diffuser radius R in at least a part of a range from 90° to 180° in the circumferential direction.

Also in the centrifugal compressor 4C shown in FIG. 7, when the range from 90° to 180° in the circumferential direction is defined as the first range S1, in the centrifugal compressor 4C, the diffuser radius R in at least a part of the first range S1 in the circumferential direction is smaller than the diffuser radius R in at least a part of the range excluding the first range S1 in the circumferential direction.

In addition, in the centrifugal compressor 4C, the minimum value R1min of the diffuser radius R in the first range S1 in the circumferential direction is smaller than the minimum value R2min of the diffuser radius R in the range excluding the first range S1 in the circumferential direction. In addition, the maximum value R1max of the diffuser radius R in the first range S1 in the circumferential direction is smaller than the maximum value R2max of the diffuser radius R in the range excluding the first range S1 in the circumferential direction. In addition, the average value R1ave (not shown) of the diffuser radiuses R in the first range S1 in the circumferential direction is smaller than the average value R0ave (not shown) of the diffuser radiuses R in the range excluding the first range S1 in the circumferential direction.

In addition, also in the centrifugal compressor 4C, the average value of the diffuser radiuses R in a range from the position of the tongue portion 18*t* of the scroll flow path 18 to 180° in the circumferential direction is smaller than the average value of the diffuser radiuses R in the range from 180° to 360° in the circumferential direction. In addition, an average value of the diffuser radiuses R in the first range S1 in the circumferential direction is smaller than an average value of the diffuser radiuses R in the range from 180° to 360° in the circumferential direction. In addition, the maximum value R1max of the diffuser radius R in the first range S1 in the circumferential direction is smaller than a minimum value of the diffuser radius R in a range excluding the position of 180° of the range from 180° to 360° in the circumferential direction. In addition, the maximum value R1max of the diffuser radius R in the first range S1 in the circumferential direction is smaller than the maximum value R2max of the diffuser radius R in the range from 180° to 360° in the circumferential direction. The minimum value R1min of the diffuser radius R in the range from 90° to 180° in the circumferential direction is smaller than a minimum value R1max of the diffuser radius R in the range from 180° to 360° in the circumferential direction.

In addition, also in the centrifugal compressor 4C, when the range from 270° to 360° in the circumferential direction is defined as the second range S2, the diffuser radius R in at least a part of the first range S1 in the circumferential direction is smaller than the diffuser radius R in at least a part of the second range S2 in the circumferential direction. In addition, the maximum value R1max of the diffuser radius R in the first range S1 in the circumferential direction is smaller than the maximum value R2max of the diffuser radius R in the second range S2 in the circumferential direction. In addition, the minimum value R1min of the diffuser radius R in the first range S1 in the circumferential direction is smaller than the minimum value R2min of the diffuser radius R in the second range S2 in the circumferential direction. In addition, the average value R1ave (not shown) of the diffuser radiuses R in the first range S1 in the circumferential direction is smaller than the minimum value R2ave (not shown) of the diffuser radius R in the second range S2 in the circumferential direction. In addition, the maximum value R1max of the diffuser radius R in the first range S1 in the circumferential direction is smaller than the minimum value R2min of the diffuser radius R in the second range S2 in the circumferential direction. In addition, the diffuser radius R in at least a part of the first range S1 in the circumferential direction takes the minimum value R1min of the diffuser radius R in the range from 0° to 360° in the circumferential direction. In addition, in at least a part of the range from 0° to 90° in the circumferential direction, the diffuser radius R decreases toward the positive direction in the circumferential direction, and in at least a part of the range from 180° to 270° in the circumferential direction, the diffuser radius R increases toward the positive direction in the circumferential direction.

In addition, also in the centrifugal compressor 4C, the average value of the diffuser radiuses R in the range from the position of the tongue portion 18*t* of the scroll flow path 18 to 180° in the circumferential direction is smaller than the average value of the diffuser radiuses R in the second range S2 in the circumferential direction. In addition, the average value of the diffuser radiuses R in the first range S1 in the circumferential direction is smaller than the average value of the diffuser radiuses R in the second range S2 in the circumferential direction. In addition, the maximum value R1max of the diffuser radius R in the first range S1 in the circumferential direction is smaller than the minimum value R2min of the diffuser radius R in the second range S2 in the circumferential direction. In addition, the maximum value R1max of the diffuser radius R in the first range S1 in the circumferential direction is smaller than the maximum value R2max of the diffuser radius R in the second range S2 in the circumferential direction. In addition, the minimum value R1min of the diffuser radius R in the first range S1 in the circumferential direction is smaller than the minimum value R2min of the diffuser radius R in the second range S2 in the circumferential direction.

Figure 8:
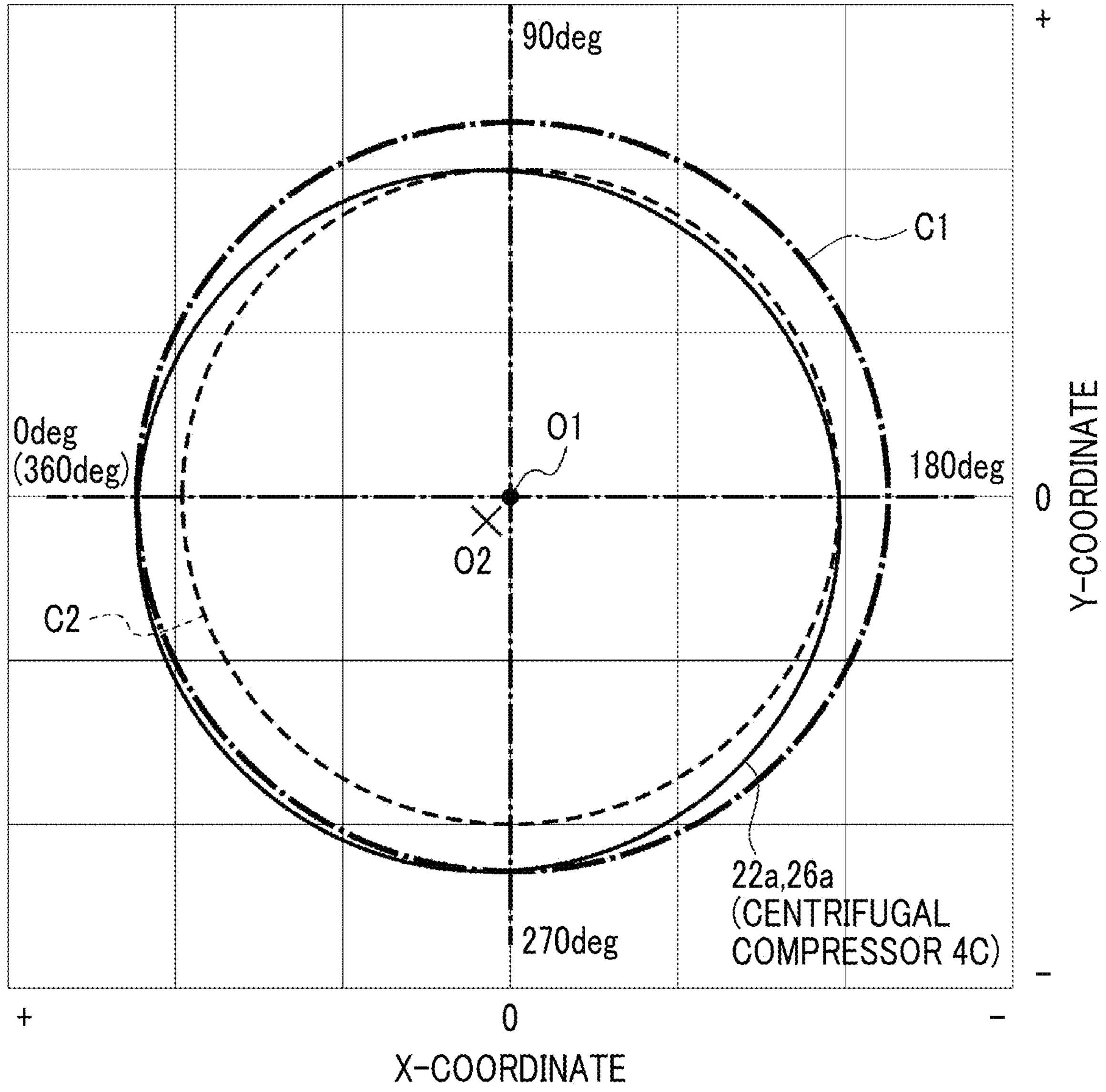
FIG. 8 is a diagram showing a position of an outlet of the diffuser flow path of the centrifugal compressor when viewed in an axial direction (position of an outer peripheral edge of a shroud side wall portion).

FIG. 8 is a diagram showing the position of the outlet 22*a* of the diffuser flow path 22 of the centrifugal compressor 4C when viewed in the axial direction (position of the outer peripheral edge 26*a* of the shroud side wall portion 26). In FIG. 8, the position of the outlet 22*a* of the diffuser flow path 22 of the centrifugal compressor 4C is shown by a solid line circle, and is shown by a one-dot chain line circle and a broken line circle with reference to two circles C1 and C2 centered on the central axis O1 (rotational axis of the impeller 6) of the inner peripheral surface 30*a* of the compressor cover 30, respectively. In FIG. 8, the position of the outlet 22*a* of the diffuser flow path 22 is shown with the central axis O1 as an origin, a direction toward a position of 0° in the circumferential direction from the origin as a positive direction of an X-coordinate, and a direction toward a position of 90° from the origin as a positive direction of a Y-coordinate.

As shown in FIG. 8, the outlet 22*a* of the diffuser flow path 22 has a circular shape when viewed in the axial direction, and a center O2 of the circular shape defining the outlet 22*a* of the diffuser flow path 22 is eccentric from the central axis O1 (rotational axis of the impeller 6) of the inner peripheral surface 30*a* of the compressor cover 30 such that the center O2 is positioned within the range from 270° to 360° in the circumferential direction. The compressor cover 30 of the centrifugal compressor 4C can be easily manufactured by eccentric processing to be described below.

Figure 9:
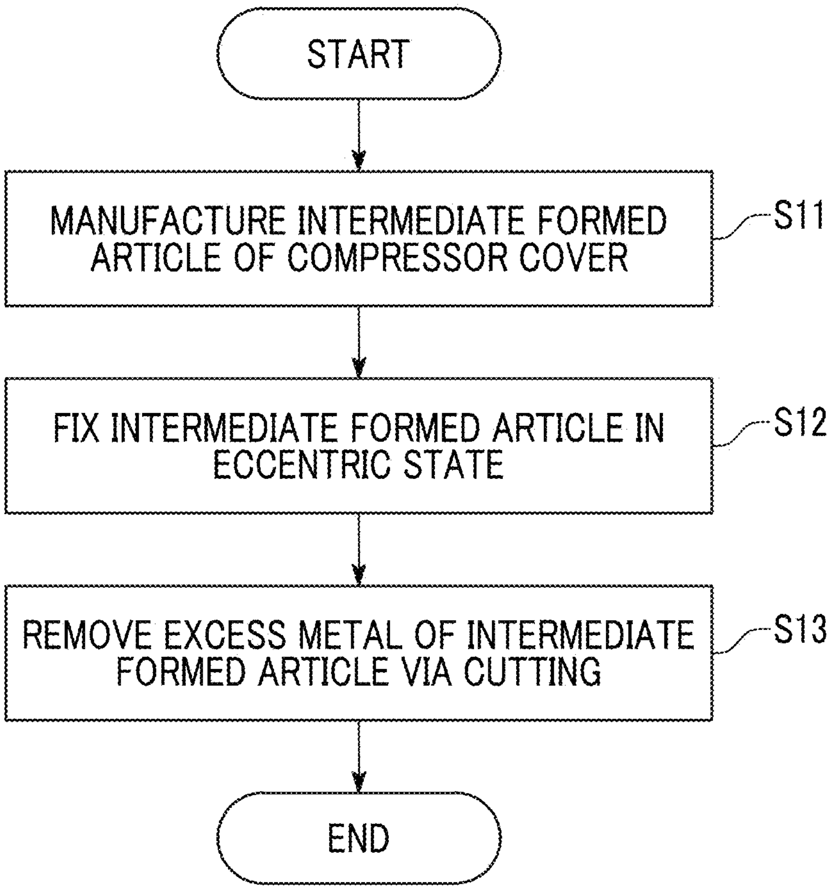
FIG. 9 is a flowchart showing an example of a method for manufacturing a compressor cover of the centrifugal compressor.
Figure 10:
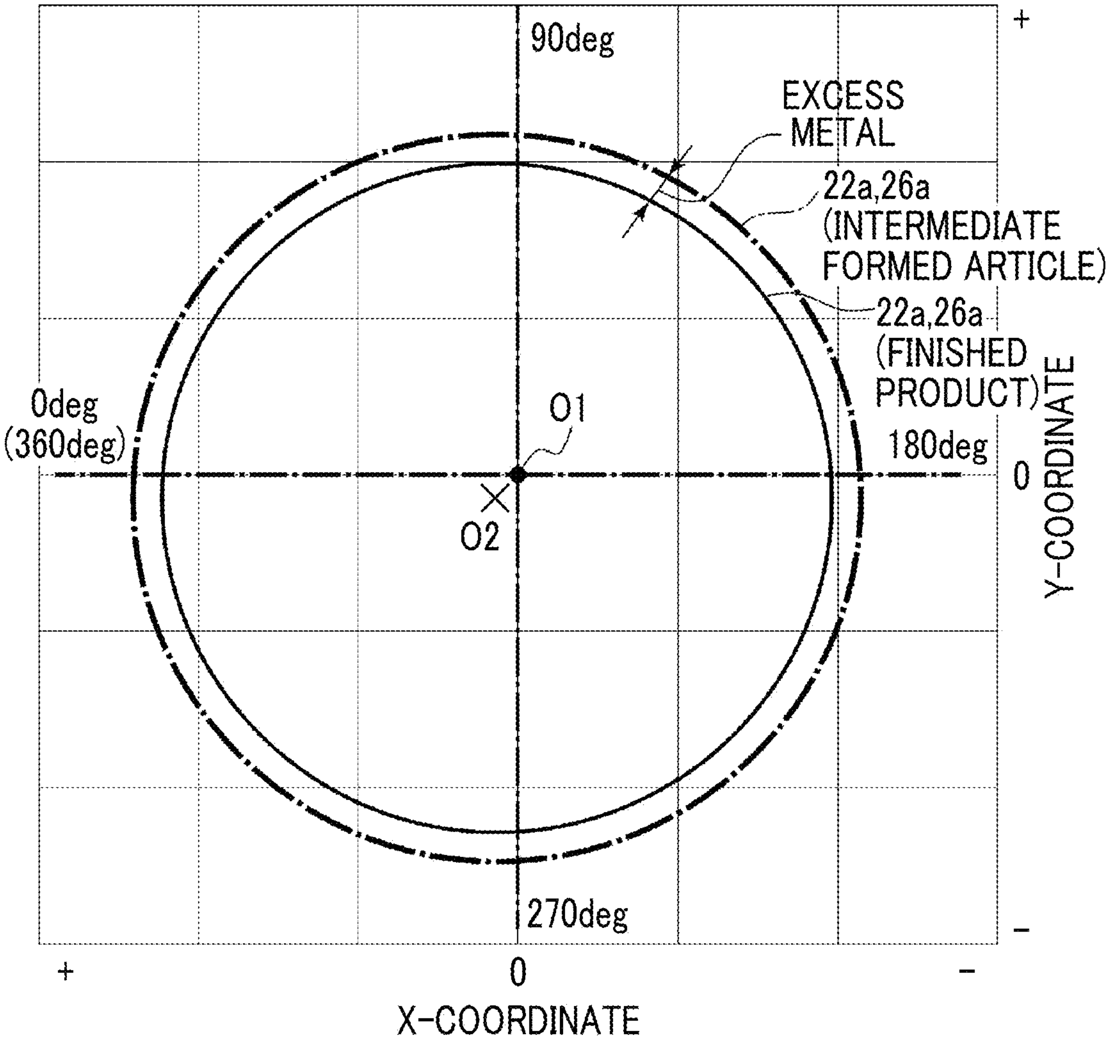
FIG. 10 is a diagram when viewed in an axial direction showing a position of an outer peripheral edge of a shroud side wall portion of the compressor cover before and after cutting of S13 in FIG. 9.

FIG. 9 is a flowchart showing an example of a method for manufacturing the compressor cover 30 of the centrifugal compressor 4C. FIG. 10 is a diagram when viewed in an axial direction showing the position of the outer peripheral edge 26*a* of the shroud side wall portion 26 of the compressor cover 30 before and after cutting of S13 in FIG. 9.

As shown in FIG. 9, in S11, an intermediate formed article of the compressor cover 30 is manufactured by, for example, casting. Here, the intermediate formed article of the compressor cover 30 is manufactured such that the outer peripheral edge 26*a* of the shroud side wall portion 26 has a cutting stock (excess metal) in the cutting in S12 as shown by a one-dot chain line circle in FIG. 10.

In S12, as shown in FIG. 10, the intermediate formed article of the compressor cover 30 is fixed (pivotally supported) by a jig (not shown) to be rotated around the rotational axis O2 eccentric from the central axis O1.

In S13, the cutting (eccentric processing) is performed to remove the above-described excess metal by rotating the intermediate formed article of the compressor cover 30 around the rotational axis O2 eccentric from the central axis O1 and bringing a cutting tool (not shown) into contact with the outer peripheral edge 26*a* (refer to the one-dot chain line circle in FIG. 10) of the shroud side wall portion 26 of the intermediate formed article of the compressor cover 30. In this manner, a finished product of the compressor cover 30 is manufactured. In the finished product of the compressor cover 30 manufactured in this way, as shown by a solid line circle in FIG. 10, the outer peripheral edge 26*a* of the shroud side wall portion 26 has a circular shape when viewed in the axial direction, and the center O2 of the circular shape defining the outer peripheral edge 26*a* is eccentric from the central axis O1 such that the center O2 is positioned within the range from 270° to 360° in the circumferential direction. That is, in the compressor cover 30 after S13 is executed, the outlet 22*a* of the diffuser flow path 22 has a circular shape when viewed in the axial direction, and the center O2 of the circular shape defining the outlet 22*a* of the diffuser flow path 22 is eccentric from the central axis O1 such that the center O2 is positioned within the range from 270° to 360° in the circumferential direction.

According to the centrifugal compressor 4C having the compressor cover 30 manufactured by the above manufacturing method, as in the centrifugal compressor 4A, it is possible to realize the centrifugal compressor that can be operated in the wide operating range with high efficiency. In addition, the compressor cover 30 can be easily manufactured by the eccentric processing.

The present disclosure is not limited to the above-described embodiments, and includes a modification of the above-described embodiments and an appropriate combination of the embodiments.

For example, in the graph shown in FIG. 6, the example in which the diffuser radius R linearly decreases and increases with respect to the change in the position in the circumferential direction has been shown. However, the diffuser radius R may smoothly change such that the diffuser radius R takes a lower value in a range from 60° to 180°, for example, than in other ranges.

In addition, in some embodiments described above, the compressor cover 30 includes the tubular portion 16, the shroud side wall portion 26 of the diffuser portion 24, and a part of the scroll portion 20. However, a compressor cover to which the present disclosure is applicable may include at least a shroud side wall portion of a diffuser portion, and may include only the shroud side wall portion of the diffuser portion, for example. In this case, a central axis of an inner peripheral surface of the compressor cover may be a central axis of an inner peripheral surface of the annular shroud side wall portion, and coincides with a rotational axis of an impeller.

In addition, in the above-described centrifugal compressors 4A to 4C, a flow path area of the scroll flow path 18 is essentially increased toward the positive direction in the circumferential direction. However, the flow path area of the scroll flow path 18 may be locally decreased toward the positive direction in a partial range in the circumferential direction. In this case, a synergistic effect with the effect of suppressing the backflow described above can be obtained by locally reducing the flow path area of the scroll flow path 18 toward the positive direction in the circumferential direction in a range where the local backflow occurs in the circumferential direction (for example, at least a part of the range from 90° to 180°).

For example, the contents described in each embodiment are understood as follows.

(1) A compressor cover (for example, the compressor cover 30 described above) according to at least one embodiment of the present disclosure is an annular compressor cover that forms a flow path wall (for example, the shroud side wall portion 26 described above) of a diffuser flow path (for example, the diffuser flow path 22 described above) in a centrifugal compressor (for example, the centrifugal compressor 4 (4A to 4C) described above), in which, when a position of a winding end (for example, the winding end 18*e* described above) of a scroll flow path (for example, the scroll flow path 18 described above) of the centrifugal compressor is defined as a position of 360° in a circumferential direction of the compressor cover, a direction in which a fluid in the scroll flow path flows in the circumferential direction is defined as a positive direction of a position in the circumferential direction, and a distance between an outlet (for example, the outlet 22*a* described above) of the diffuser flow path and a central axis (for example, the central axis O1 described above) of an inner peripheral surface of the compressor cover for each position in the circumferential direction is defined as a diffuser radius (for example, the diffuser radius R described above), an average value of the diffuser radiuses in a range from a position of a tongue portion of the scroll flow path to 180° in the circumferential direction is smaller than an average value of the diffuser radiuses in a range from 180° to 360° in the circumferential direction.

According to the compressor cover described in the above (1), it is possible to reduce a load on the diffuser flow path in the range from the position of the tongue portion to 180°, which is a range including a place where the stall region is likely to occur in the circumferential direction (range from 90° to 180°), more than the load on the diffuser flow path in other ranges. Therefore, it is possible to suppress the formation of the local low speed region and the occurrence of the backflow in the diffuser flow path, and to expand an operating range of the centrifugal compressor to a low flow rate side. In addition, compared to a case where the diffuser radius R is uniformly reduced from 0° to 360°, it is possible to promote a pressure recovery in the diffuser flow path in the range from 180° to 360° in the circumferential direction. Therefore, it is possible to suppress a decrease in compressor efficiency. Therefore, it is possible to realize the centrifugal compressor that can be operated in a wide operating range with high efficiency.

(2) In some embodiments, in the compressor cover described in the above (1), an average value of the diffuser radiuses in a range from 90° to 180° in the circumferential direction is smaller than the average value of the diffuser radiuses in the range from 180° to 360° in the circumferential direction.

According to the compressor cover described in the above (2), it is possible to reduce a load on the diffuser flow path in the range from 90° to 180°, which is the place where the stall region is likely to occur in the circumferential direction, more than the load on the diffuser flow path in the range from 180° to 360° in the circumferential direction. Therefore, it is possible to suppress the formation of the local low speed region and the occurrence of the backflow in the diffuser flow path, and to expand the operating range of the centrifugal compressor to the low flow rate side. In addition, compared to the case where the diffuser radius R is uniformly reduced from 0° to 360°, it is possible to promote the pressure recovery in the diffuser flow path in at least a part of the range excluding the first range in the circumferential direction. Therefore, it is possible to suppress the decrease in the compressor efficiency. Therefore, it is possible to realize the centrifugal compressor that can be operated in a wide operating range with high efficiency.

(3) In some embodiments, in the compressor cover described in the above (1) or (2), (for example, the maximum value R1max described above) a maximum value of the diffuser radius in a range from 90° to 180° in the circumferential direction is smaller than a minimum value of the diffuser radius in a range excluding a position of 180° of the range from 180° to 360° in the circumferential direction.

According to the compressor cover described in the above (3), it is possible to enhance the above-described effect of expanding the operating range of the centrifugal compressor to the low flow rate side and the above-described effect of suppressing the decrease in the compressor efficiency.

(4) In some embodiments, in the compressor cover described in any one of the above (1) to (3), a maximum value of the diffuser radius in a range from 90° to 180° in the circumferential direction is smaller than a maximum value of the diffuser radius in the range from 180° to 360° in the circumferential direction.

According to the compressor cover described in the above (4), it is possible to enhance the above-described effect of expanding the operating range of the centrifugal compressor to the low flow rate side and the above-described effect of suppressing the decrease in the compressor efficiency.

(5) In some embodiments, in the compressor cover described in any one of the above (1) to (4), a minimum value of the diffuser radius in a range from 90° to 180° in the circumferential direction is smaller than a minimum value of the diffuser radius in the range from 180° to 360° in the circumferential direction.

According to the compressor cover described in the above (5), it is possible to enhance the above-described effect of expanding the operating range of the centrifugal compressor to the low flow rate side and the above-described effect of suppressing the decrease in the compressor efficiency.

(6) In some embodiments, in the compressor cover described in any one of the above (1) to (5), the average value of the diffuser radiuses in the range from the position of the tongue portion of the scroll flow path to 180° in the circumferential direction is smaller than an average value of the diffuser radiuses in a range from 270° to 360° in the circumferential direction.

According to the compressor cover described in the above (6), it is possible to reduce a load on the diffuser flow path in the range from the position of the tongue portion to 180°, which is a range including a place where the stall region is likely to occur in the circumferential direction (range from 90° to 180°), more than the load on the diffuser flow path in the range from 270° to 360°, which is a place where the stall region is unlikely to occur in the circumferential direction (region where the flow is normal). Therefore, it is possible to suppress the formation of the local low speed region and the occurrence of the backflow in the diffuser flow path, and to expand the operating range of the centrifugal compressor to the low flow rate side. In addition, compared to the case where the diffuser radius R is uniformly reduced from 0° to 360°, it is possible to promote the pressure recovery in the diffuser flow path in the range from 270° to 360° in the circumferential direction. Therefore, it is possible to suppress the decrease in the compressor efficiency. Therefore, it is possible to realize the centrifugal compressor that can be operated in a wide operating range with high efficiency.

(7) In some embodiments, in the compressor cover described in any one of the above (1) to (6), an average value of the diffuser radiuses in a range from 90° to 180° in the circumferential direction is smaller than an average value of the diffuser radiuses in a range from 270° to 360° in the circumferential direction.

According to the compressor cover described in the above (7), it is possible to reduce a load on the diffuser flow path in the range from 90° to 180°, which is the place where the stall region is likely to occur in the circumferential direction, more than the load on the diffuser flow path in the range from 270° to 360°, which is a place where the stall region is unlikely to occur in the circumferential direction (region where the flow is normal). Therefore, it is possible to suppress the formation of the local low speed region and the occurrence of the backflow in the diffuser flow path, and to expand the operating range of the centrifugal compressor to the low flow rate side. In addition, compared to the case where the diffuser radius R is uniformly reduced from 0° to 360°, it is possible to promote the pressure recovery in the diffuser flow path in the range from 270° to 360° in the circumferential direction. Therefore, it is possible to suppress the decrease in the compressor efficiency. Therefore, it is possible to realize the centrifugal compressor that can be operated in a wide operating range with high efficiency.

(8) In some embodiments, in the compressor cover described in any one of the above (1) to (7), a maximum value of the diffuser radius in a range from 90° to 180° in the circumferential direction is smaller than a minimum value of the diffuser radius in a range from 270° to 360° in the circumferential direction.

According to the compressor cover described in the above (8), it is possible to enhance the above-described effect of expanding the operating range of the centrifugal compressor to the low flow rate side and the above-described effect of suppressing the decrease in the compressor efficiency.

(9) In some embodiments, in the compressor cover described in any one of the above (1) to (8), a maximum value of the diffuser radius in a range from 90° to 180° in the circumferential direction is smaller than a maximum value of the diffuser radius in a range from 270° to 360° in the circumferential direction.

According to the compressor cover described in the above (9), it is possible to enhance the above-described effect of expanding the operating range of the centrifugal compressor to the low flow rate side and the above-described effect of suppressing the decrease in the compressor efficiency.

(10) In some embodiments, in the compressor cover described in any one of the above (1) to (9), a minimum value of the diffuser radius in a range from 90° to 180° in the circumferential direction is smaller than a minimum value of the diffuser radius in the range from 180° to 360° in the circumferential direction.

According to the compressor cover described in the above (10), it is possible to enhance the above-described effect of expanding the operating range of the centrifugal compressor to the low flow rate side and the above-described effect of suppressing the decrease in the compressor efficiency.

(11) In some embodiments, in the compressor cover described in any one of the above (1) to (10), in at least a part of a range from 0° to 60° in the circumferential direction in a graph in which the position in the circumferential direction is represented on a horizontal axis and the diffuser radius is represented on a vertical axis, the diffuser radius decreases toward the positive direction in the circumferential direction.

According to the compressor cover described in the above (11), in at least a part of the range from 0° to 60° in the circumferential direction, it is possible to reduce a load on the diffuser flow path toward the first range from 90° to 180°, which is the place where the stall region is likely to occur in the circumferential direction. Therefore, it is possible to enhance an effect of expanding the operating range of the centrifugal compressor to the low flow rate side.

(12) In some embodiments, in the compressor cover described in any one of the above (1) to (11), in at least a part of a range from 180° to 270° in the circumferential direction in a graph in which the position in the circumferential direction is represented on a horizontal axis and the diffuser radius is represented on a vertical axis, the diffuser radius increases toward the positive direction in the circumferential direction.

According to the compressor cover described in the above (12), in at least a part of the range from 180° to 270° in the circumferential direction, it is possible to increase a load on the diffuser flow path toward the range from 270° to 360° (toward the positive direction in the circumferential direction), which is the place where the stall region is unlikely to occur in the circumferential direction, to enhance a function of a pressure recovery. In addition, in at least a part of the range from 180° to 270° in the circumferential direction, it is possible to reduce a load on the diffuser flow path toward the range from 90° to 180° (toward a negative direction in the circumferential direction), which is the place where the stall region is likely to occur in the circumferential direction. Therefore, it is possible to enhance an effect of expanding the operating range of the centrifugal compressor to the low flow rate side and an effect of suppressing the decrease in the compressor efficiency.

(13) In some embodiments, in the compressor cover described in any one of the above (1) to (12), the outlet of the diffuser flow path has a circular shape when viewed in an axial direction of the compressor cover, and a center (for example, the center O2 described above) of the circular shape defining the outlet of the diffuser flow path is eccentric from the central axis (for example, the central axis O1 described above) such that the center is positioned within a range from 270° to 360° in the circumferential direction.

According to the compressor cover described in the above (13), the effect described in the above (1) can be obtained with a simple configuration in which a shape of the outlet of the diffuser flow path when viewed in the axial direction is defined by a circular shape. Therefore, the compressor cover that can obtain the effect described in the above (1) can be easily formed by eccentric processing.

(14) A centrifugal compressor (for example, the centrifugal compressor 4 (4A to 4C) described above) according to at least one embodiment of the present disclosure includes an impeller (for example, the impeller 6 described above), and the compressor cover (for example, the compressor cover 30 described above) described in any one of the above (1) to (13).

According to the centrifugal compressor described in the above (14), since it includes the compressor cover described in any one of the above (1) to (13), it is possible to realize a centrifugal compressor that can be operated in a wide operating range with high efficiency.

(15) A turbocharger according to at least one embodiment of the present disclosure includes the centrifugal compressor (for example, the centrifugal compressor 4 (4A to 4C) described above) described in the above (14).

According to the turbocharger described in the above (15), since it includes the centrifugal compressor described in the above (1), it is possible to realize a turbocharger that can be operated in a wide operating range with high efficiency.

(16) A method for manufacturing a compressor cover according to at least one embodiment of the present disclosure is a method for manufacturing a compressor cover (for example, the compressor cover 30 described above) that forms a flow path wall (for example, the shroud side wall portion 26 described above) of a diffuser flow path (for example, the diffuser flow path 22 described above) in a centrifugal compressor (for example, the centrifugal compressor 4 (4A to 4C) described above), the method including a step of manufacturing an intermediate formed article of the compressor cover, and a step of cutting an edge portion (for example, the outer peripheral edge *26a* described above) defining an outlet of the diffuser flow path in the intermediate formed article of the compressor cover while rotating the intermediate formed article of the compressor cover around a rotational axis (for example, the rotational axis O2 described above) eccentric from a central axis (for example, the central axis O1 described above) of an inner peripheral surface of the compressor cover.

According to the method for manufacturing a compressor cover described in the above (16), a shape of the outlet of the diffuser flow path in the axial direction view of the compressor cover can be made circular, and the compressor cover can be manufactured such that the center of the circular shape is eccentric from the central axis of the inner peripheral surface of the compressor cover. Therefore, by setting a direction in which the center of the circular shape is eccentric with respect to the central axis of the inner peripheral surface of the compressor cover in consideration of a place where the backflow is likely to occur in the diffuser flow path, it is possible to easily manufacture a compressor cover that realizes a centrifugal compressor that can be operated in a wide operating range with high efficiency.

(17) In some embodiments, in the method for manufacturing a compressor cover described in the above (16), when a position of a winding end (for example, the winding end 18*e* described above) of a scroll flow path (for example, the scroll flow path 18 described above) of the centrifugal compressor is defined as a position of 360° in a circumferential direction of the compressor cover and a direction in which a fluid in the scroll flow path flows in the circumferential direction is defined as a positive direction of a position in the circumferential direction, in the step of cutting the edge portion, the edge portion is cut while rotating the intermediate formed article of the compressor cover around the rotational axis (for example, the rotational axis O2 described above) positioned within a range from 270° to 360° in the circumferential direction.

According to the method for manufacturing a compressor cover described in the above (17), a compressor cover having the following effects can be easily manufactured, for example, by turning processing. According to the compressor cover manufactured by the method for manufacturing a compressor cover described in the above (14), it is possible to reduce a load on the diffuser flow path in the range from 90° to 180°, which is the place where the stall region is likely to occur in the circumferential direction, more than the load on the diffuser flow path in the range from 270° to 360°, which is a place where the stall region is unlikely to occur in the circumferential direction (region where the flow is normal). Therefore, it is possible to suppress the formation of the local low speed region and the occurrence of the backflow in the diffuser flow path, and to expand the operating range of the centrifugal compressor to the low flow rate side. In addition, compared to the case where the diffuser radius R is uniformly reduced from 0° to 360°, it is possible to promote the pressure recovery in the diffuser flow path in the range from 270° to 360° in the circumferential direction. Therefore, it is possible to suppress the decrease in the compressor efficiency. Therefore, it is possible to provide a compressor cover that can realize the centrifugal compressor that can be operated in a wide operating range with high efficiency.

(18) A diffuser (for example, the diffuser portion 24 described above) for a centrifugal compressor according to at least one embodiment of the present disclosure includes a shroud side wall portion (for example, the shroud side wall portion 26), and a hub side wall portion (for example, the hub side wall portion 28 described above) that faces the shroud side wall portion and that forms an annular diffuser flow path (for example, the diffuser flow path 22 described above) between the shroud side wall portion and the hub side wall portion, in which, when a position of a winding end (for example, the winding end 18*e* described above) of a scroll flow path (for example, the scroll flow path 18 described above) of the centrifugal compressor is defined as a position of 360° in a circumferential direction of the diffuser, a direction in which a fluid in the scroll flow path flows in the circumferential direction is defined as a positive direction of a position in the circumferential direction, and a distance between an outlet (for example, the outlet 22*a* described above) of the diffuser flow path and a rotational axis (for example, the rotational axis O1 described above) of an impeller (for example, the impeller 6 described above) of the centrifugal compressor for each position in the circumferential direction is defined as a diffuser radius (for example, the diffuser radius R described above), an average value of the diffuser radiuses in a range from a position of a tongue portion of the scroll flow path to 180° in the circumferential direction is smaller than an average value of the diffuser radiuses in a range from 180° to 360° in the circumferential direction.

According to the diffuser for a centrifugal compressor described in the above (18), it is possible to reduce a load on the diffuser flow path in the range from the position of the tongue portion to 180°, which is a range including a place where the stall region is likely to occur in the circumferential direction (range from 90° to) 180°, more than the load on the diffuser flow path in other ranges. Therefore, it is possible to suppress the formation of the local low speed region and the occurrence of the backflow in the diffuser flow path, and to expand an operating range of the centrifugal compressor to a low flow rate side. In addition, compared to a case where the diffuser radius R is uniformly reduced from 0° to 360°, it is possible to promote a pressure recovery in the diffuser flow path in the range from 180° to 360° in the circumferential direction. Therefore, it is possible to suppress a decrease in compressor efficiency. Therefore, it is possible to provide a diffuser for a centrifugal compressor that can realize the centrifugal compressor that can be operated in a wide operating range with high efficiency.

REFERENCE SIGNS LIST

2: turbocharger
4 (4A, 4B, 4C): centrifugal compressor
6: impeller
8: rotary shaft
10: turbine wheel
12: turbine
13: air inlet
14: casing
15: impeller accommodation space
16: tubular portion
18: scroll flow path
18*a*: winding start portion
18*b*: discharge portion
18*e*: winding end
18*t*: tongue portion
20: scroll portion
22: diffuser flow path
22*a*: outlet
24: diffuser portion
26: shroud side wall portion
26*a*: outer peripheral edge (outer end in radial direction)
28: hub side wall portion
30: compressor cover
30*a*: inner peripheral surface
32: bearing casing

The invention claimed is:

1. An annular compressor cover that forms a flow path wall of a diffuser flow path in a centrifugal compressor, wherein, when a position of a winding end of a scroll flow path of the centrifugal compressor is defined as a position of 360° in a circumferential direction of the compressor cover, a direction in which a fluid in the scroll flow path flows in the circumferential direction is defined as a positive direction of a position in the circumferential direction, and a distance between an outlet of the diffuser flow path and a central axis of an inner peripheral surface of the compressor cover for each position in the circumferential direction is defined as a diffuser radius, an average value of the diffuser radiuses in a range from a position of a tongue portion of the scroll flow path to 180° in the circumferential direction is smaller than an average value of the diffuser radiuses in a range from 180° to 360° in the circumferential direction, and wherein, when viewed in an axial direction of the compressor cover, the outlet of the diffuser flow path has a perfect circular shape, and a center of the perfect circular shape defining the outlet of the diffuser flow path is eccentric from the central axis such that the center is positioned within a range from 270° to 360° in the circumferential direction.

2. The compressor cover according to claim 1, wherein an average value of the diffuser radiuses in a range from 90° to 180° in the circumferential direction is smaller than the average value of the diffuser radiuses in the range from 180° to 360° in the circumferential direction.

3. The compressor cover according to claim 1, wherein a maximum value of the diffuser radiuses in a range from 90° to 180° in the circumferential direction is smaller than a minimum value of the diffuser radiuses in a range excluding 180° of the range from 180° to 360° in the circumferential direction.

4. The compressor cover according to claim 1, wherein a maximum value of the diffuser radiuses in a range from 90° to 180° in the circumferential direction is smaller than a maximum value of the diffuser radiuses in the range from 180° to 360° in the circumferential direction.

5. The compressor cover according to claim 1, wherein a minimum value of the diffuser radiuses in a range from 90° to 180° in the circumferential direction is smaller than a minimum value of the diffuser radiuses in the range from 180° to 360° in the circumferential direction.

6. The compressor cover according to claim 1, wherein the average value of the diffuser radiuses in the range from the position of the tongue portion of the scroll flow path to 180° in the circumferential direction is smaller than an average value of the diffuser radiuses in a range from 270° to 360° in the circumferential direction.

7. The compressor cover according to claim 1, wherein an average value of the diffuser radiuses in a range from 90° to 180° in the circumferential direction is smaller than an average value of the diffuser radiuses in a range from 270° to 360° in the circumferential direction.

8. The compressor cover according to claim 1, wherein a maximum value of the diffuser radius in a range from 90° to 180° in the circumferential direction is smaller than a minimum value of the diffuser radius in a range from 270° to 360° in the circumferential direction.

9. The compressor cover according to claim 1, wherein a maximum value of the diffuser radius in a range from 90° to 180° in the circumferential direction is smaller than a maximum value of the diffuser radius in a range from 270° to 360° in the circumferential direction.

10. The compressor cover according to claim 1, wherein in at least a part of a range from 0° to 60° in the circumferential direction in a graph in which the position in the circumferential direction is represented on a horizontal axis and the diffuser radius is represented on a vertical axis, the diffuser radius decreases toward the positive direction in the circumferential direction.

11. The compressor cover according to claim 1, wherein in at least a part of a range from 180° to 270° in the circumferential direction in a graph in which the position in the circumferential direction is represented on a horizontal axis and the diffuser radius is represented on a vertical axis, the diffuser radius increases toward the positive direction in the circumferential direction.

12. A centrifugal compressor comprising:

an impeller; and the compressor cover according to claim 1.

13. A turbocharger comprising:

the centrifugal compressor according to claim 12.

* * * * *